United States Statutory Invention Registration [19]

[11] Reg. Number: H598

Creedon et al.

[43] Published: Mar. 7, 1989

[54] TOKAMAK REACTOR FIRST WALL

[75] Inventors: Richard L. Creedon, San Diego, Calif.; Howard E. Levine, Cambridge, Mass.; Clement Wong, San Diego, Calif.; James Battaglia, Somerville, Mass.

[73] Assignee: The United States of America as represented by United States Department of Energy, Washington, D.C.

[21] Appl. No.: 673,450

[22] Filed: Nov. 20, 1984

[51] Int. Cl.[4] ..... G21B 1/00

[52] U.S. Cl. ..... 376/136; 376/146; 376/150

[58] Field of Search ..... 376/136, 146, 150

[56] References Cited

U.S. PATENT DOCUMENTS

| | | | |
|---|---|---|---|
| 3,054,742 | 9/1962 | Thoneman et al. | 376/132 |
| 3,105,031 | 9/1963 | Thoneman et al. | 376/136 |
| 3,105,806 | 10/1963 | Thoneman | 376/136 |
| 3,109,801 | 11/1963 | Thoneman | 376/136 |
| 4,116,264 | 9/1978 | Farfaletti-Casali et al. | 165/47 |
| 4,303,473 | 12/1981 | Nagao et al. | 376/150 |

OTHER PUBLICATIONS

Wong et al., "Helium-Cooled Blanket Designs", *Transactions of the American Nuclear Society,* vol. 46, Jun. 1984, pp. 200–201.

Abdov et al., *Blanket Comparison and Selection Study,* ANL, FPP-83-1, vol. I, Oct. 1983, pp. VII-116–VII--125.

Hansen et al., "Nuclear Engineering Questions: Power, Reprocessing, Waste, Decontamination, Fusion.", No. 191, vol. 75, 1979, pp. 182–192.

Ragheb et al., "Fusion Technology", vol. 6, Sep. 1984, pp. 195–217.

Wong et al., "Fusion Technology", vol. 8, Jul. 1985, pp. 114–131.

*Primary Examiner*—John F. Terapane
*Assistant Examiner*—Eric Jorgensen
*Attorney, Agent, or Firm*—Clifton E. Clouse, Jr.; Roger S. Gaither; Judson R. Hightower

[57] ABSTRACT

A first wall construction for a tokamak reactor is disclosed, comprising a series of hollow lobes, each having a pair of side wall portions with a curved end wall portion extending therebetween. Each lobe is adapted to withstand substantial pressure on the concave side of the curved end wall portion while withstanding substantial heat flux on the convex side. The curved end wall portion has a shape which is approximately cylindrical in curvature but differs from being circular in curvature by a substantial deviation, in that such curved end wall portion is flatter in curvature than a truly circular curvature by the amount of such deviation, such that the thermal stresses generated in the curved end wall portion by such heat flux are at least approximately balanced or neutralized by the bending stresses generated in such curved end wall portion by such pressure. The curvature may correspond generally in shape to the flatter half of an ellipse. Each hollow lobe may comprise a generally plate-like member formed in one piece into such side wall portions and such curved end wall portion, or may be formed with a plurality of peripheral corrugations affording a flexible bellows action to relieve stresses in a direction transverse to such corrugations. The invention is applicable to other vessels subjected to similar pressure and thermal stresses.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

END PLATE 131

CORRUGATED FIRST WALL 110
END PLATE 131
WELD 141
THIN SS CONNECTOR 139
WELD 143
FIRST WALL 110

125
FIRST WALL 110
125
V
120
EXPANSION DIRECTIONS
124
FIRST WALL
125
129
IV
110
112
131
133
135
HELIUM IN
HELIUM OUT
137
HELIUM OUT
HELIUM IN
135

TOKAMAK REACTOR FIRST WALL

FIELD OF THE INVENTION

This invention relates to an improved first wall construction for a tokamak fusion reactor vessel, or other vessels subjected to similar pressure and thermal stresses.

BACKGROUND OF THE INVENTION

A tokamak reactor is a known type of thermonuclear fusion reactor, involving a generally doughnut-shaped vessel or casing, in which a vacuum is maintained. A thermonuclear reaction is produced in a high temperature plasma, circulating within the vessel. The plasma produces a high heat flux and also a high neutron flux. The heat flux is transferred to and removed by a coolant, such as high pressure helium, circulated through passages which are separated from the vacuum space by the first wall of the reactor. Such passages may also contain lithium in some form, such as lithium oxide, which is bombarded by the neutron flux to produce tritium, for use as thermonuclear fuel.

Thus, the first wall is subjected to an extremely high heat flux and a high neutron flux on one side, while being subjected to a high pressure on the opposite side. The first wall must be able to withstand the high heat flux, the high neutron flux and the high pressure.

In various known tokamak reactor constructions, the first wall includes a plurality of hollow lobes, in which the lithium oxide or the like is present, and through which the helium coolant is circulated. Tubular members may be provided within the lobes, to contain the lithium or lithium oxide. Each lobe comprises a pair of side wall portions and a curved end wall portion extending therebetween. In the known constructions, the curved end wall has a substantially cylindrical curvature.

The pressurized helium coolant, within each lobe, exerts a high fluid pressure on the concave side of the curved end wall. Due to the substantially cylindrical curvature of the end wall, the pressure produces substantially pure tensile stresses in the curved end wall. Thus, the curved end wall is loaded in substantially pure membrane tension by the pressurized coolant.

The convex side of the curved end wall confronts the extremely hot plasma, which produces a high heat flux and a high neutron flux, directed upon the convex side. Due to the coolant on the concave side and the high heat and neutron fluxes on the convex side, there is a large temperature differential between the convex side and the concave side of the curved end wall. If the end wall were flat and unrestrained, it would tend to warp into a spherically curved shape, due to the high temperature differential between the hot and cool sides of the wall. However, the cylindrically curved end wall is restrained against such warpage, with the result that high thermal stresses tend to develop in the curved end wall, due to the high temperature differential between the convex and concave sides of the wall. The high thermal stresses limit the practicality of this design.

The present invention is directed to the problem of dealing more effectively with this difficult combination of pressure stresses and thermal stresses in the first wall.

SUMMARY OF THE INVENTION

One object of the present invention is to provide a new and improved first wall construction, in which the thermal stresses in the wall are at least approximately or partially counteracted or neutralized by opposite stresses developed in the first wall by the pressure of the coolant.

To achieve this object, the present invention preferably comprises a first wall construction for a tokamak reactor vessel or some other vessel subjected to substantial pressure and temperature differentials, such first wall being of the type comprising a series of hollow lobes, each lobe having a pair of side wall portions with a curved end wall portion extending therebetween, the curved end wall portion having a concave side and a convex side. Each lobe is adapted to withstand substantial pressure on the concave side while withstanding substanital heat flux on the convex side. The curved end wall portion has a shape which is approximately cylindrical in curvature, but differs from being truly circular in curvature by a substantial deviation, in that the curved end wall portion is flatter in curvature than a truly circular curvature, by the amount of such deviation, such that the thermal stresses generated in the curved end wall portion by such heat flux are at least approximately balanced or counteracted by the bending stresses, generated in the curved end wall portion by the high pressure on the concave side.

The curved end wall portion may have a cross sectional curvature which is generally semi-elliptical or semi-oval, and which corresponds generally in shape to the flatter half of an ellipse or oval.

The high temperature differential between the convex and concave sides tends to produce compressive stresses on the convex side and tensile stresses on the concave side. The bending stresses, due to the flattened curvature, tend to produce an opposite stress differential between the concave and convex sides, so that the thermal stresses are at least approximately or partially counteracted.

The hollow lobe may comprise a generally platelike member formed in one piece into the side wall portions and the curved end wall portion. However, the invention is also applicable to a modified construction in which the curved end wall portion is formed with a plurality of peripheral currugations affording a flexible bellows action to relieve stresses in a direction transverse to the corrugations.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENTS

Figure 1:
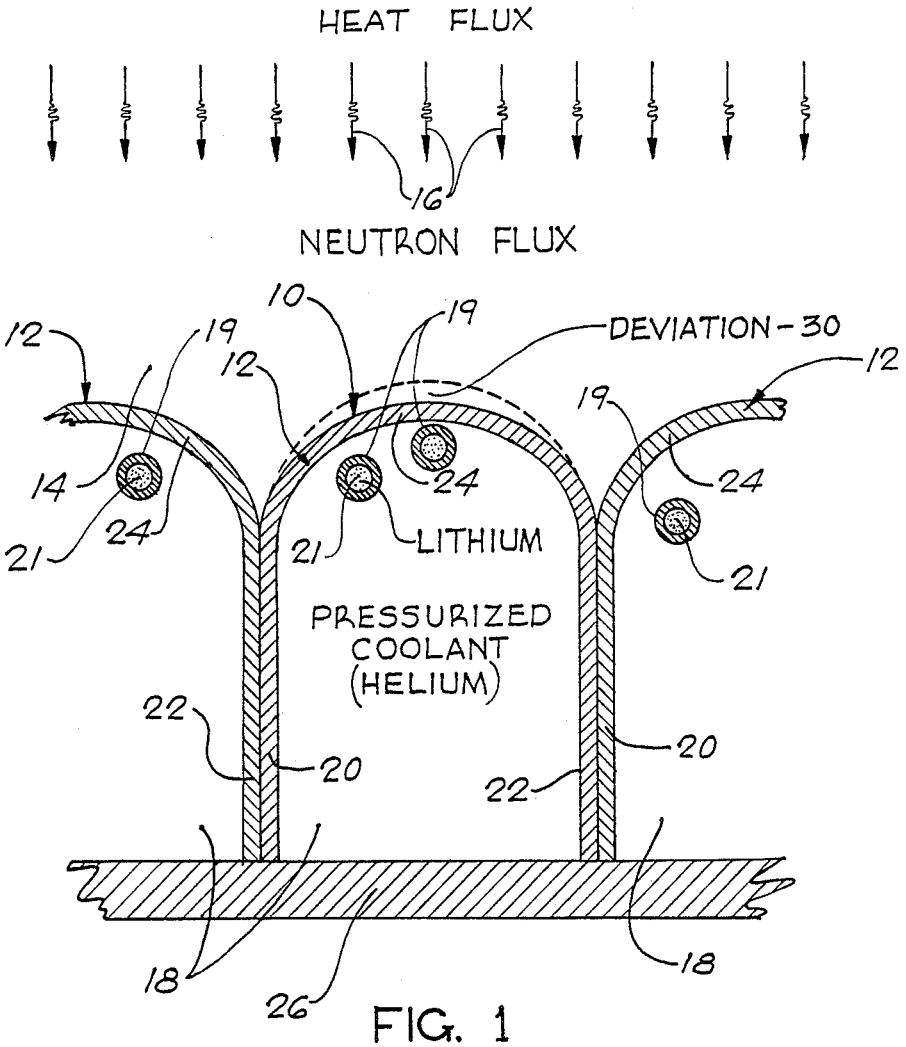
FIG. 1 is a somewhat diagrammatic sectional view, illustrating an improved first wall to be described as an illustrative embodiment of the present invention.
Figure 2:
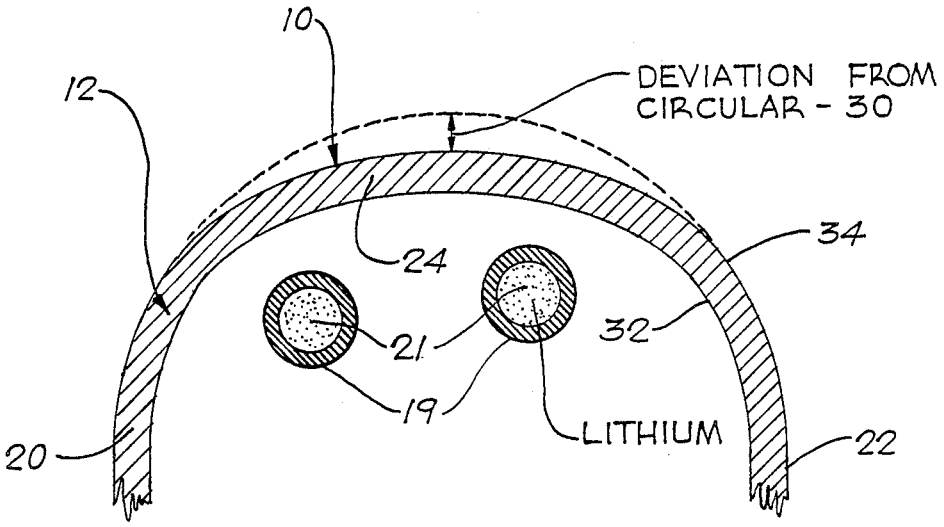
FIG. 2 is an enlarged somewhat diagrammatic section corresponding to a portion of FIG. 1.

FIGS. 1 and 2 illustrate a first wall 10 for a tokamak fusion reactor. The first wall 10 confronts the hot circulating plasma in the reactor and comprises a series of hollow lobes 12. The tokamak reactor has a vacuum space 14 in which the hot plasma is circulated. The hot plasma may comprise deuterium and tritium ions, which are accelerated to extremely high energies by electrical fields, while also being guided or focussed by magnetic fields. In this way, the temperature and pressure in the plasma become high enough to produce a thermonuclear fusion reaction.

Such fusion reaction produces an extremely great heat flux, as represented by the arrows 16, directed toward the lobes 12.

The first wall 10 separates the vacuum space 14 from hollow spaces or passages 18 within the hollow lobes 12. A coolant or heat exchange medium is circulated through the passages 18. For example, such coolant may be pressurized helium. The coolant absorbs and removes the heat flux 16 which radiates from the plasma to the first wall and passes through the first wall into the passages 18.

The hot coolant from the passages 18 may be employed as a source of useful energy, as, for example, to produce steam to operate a turbine which drives an electrical generator.

The hot plasma in the vacuum space 14 also produces a high neutron flux, due to the thermonuclear fusion reaction in the plasma. The neutron flux, like the heat flux 16, is directed upon the first wall 10. Part of the neutron flux is absorbed and produces heating of the first wall 10, while another part of the neutron flux passes through the first wall into the passages 18 within the lobes 12. Lithium in some form is often placed in the passages 18 within the lobes 12, for bombardment by the neutrons to produce tritium by fission of the lithium. For example, the lithium may be in the form of liquid lithium or solid lithium oxide. The tritium may be recovered and used as thermonuclear fuel, so that the tokamak reactor acts as a breeder reactor, to produce its own tritium fuel. As shown in FIG. 1, there are tubular members 19 within the lobes 12. Such tubular members contain lithium in some form, as indicated at 21. The tubular members 19 are shown diagrammatically and may be of any known or suitable arrangement, number and shape, such as circular or rectangular in cross-section.

As shown in FIG. 1, each of the adjacent lobes 12 has a pair of side wall portions 20 and 22 with a curved end wall portion 24 extending therebetween. The side wall portions 20 and 22 are shown as being welded or otherwise secured to a thick strong back wall 26.

Each lobe 12 may be made in one piece from a flat platelike member and may be bent or otherwise formed to produce the generally flat side wall portions 20 and 22 and the curved end wall portion 24.

It will be understood that each lobe 12 contains helium or some other coolant at a high pressure, which produces a very considerable pressure upon the concave side of the curved wall portion 24. On the other hand, the convex side of the curved wall portion 24 confronts the vacuum space 14, so that a great pressure differential exists between the concave and convex sides. Heretofore, it has been the practice to make the curved end wall portion 24 truly cylindrical or circular in curvature, so that the high pressure differential produces substantially pure tension in the curved end wall portion 24.

In accordance with the present invention, however, the curved end wall portion 24 is produced with a curvature which is approximately cylindrical or circular in cross-section, but differs from being truly circular by a deviation 30 which is shown on a somewhat exaggerated scale in FIGS. 1 and 2, for clarity of illustration. The deviation 30 is such that the curved end wall portion 24 is somewhat flatter in curvature than a truly cylindrical or circular cross sectional shape. To assist in visualizing this deviation 30, it may be said that the curvature of the curved end wall portion 24 resembles the curvature of the flatter half of an ellipse or an oval. Thus, the curvature may be described as approximately semi-elliptical or semi-oval.

In the construction of the curved end wall portion 24, the deviation 30 from a truly circular or cylindrical cross-sectional curvature is employed for at least approximately or partially neutralizing or counteracting the thermal stresses produced in the curved wall by the extremely intense heat flux 16, received from the hot plasma. The intense heat flux produces a great temperature differential between the convex side and the concave side of the curved end wall portion 24. The convex side is impacted directly by the heat flux and thus is heated to a high temperature. The concave side is cooled to a much lower temperature by the pressurized helium or other coolant in the passages 18. If the wall 24 were free and unrestrained, this temperature differential would tend to cause the wall to warp or curl into a shape having a spherical curvature. This warping tendancy is generally proportional to the thickness of the wall, and also to the amount of the temperature differential. However, because the curved end wall portion 24 is formed into an approximately cylindrical shape, the wall is restrained so that it can not warp into a spherically curved shape. Instead, the temperature differential tends to produce thermal stresses in the curved wall 24. Such thermal stresses tend to be compressive stresses on the convex side of the curved wall 24, and tensile stresses on the concave side.

The high neutron flux which accompanies the high heat flux also tends to produce heating of the curved end wall portion 24. Moreover, the neutron flux tends to produce embrittlement of the entire first wall 10, including the curved end wall portion 24, which may be made of stainless steel or some other suitable material.

In the absence of the present invention, the high thermal stresses in the curved end wall portion 24, produced by the high heat flux and the high neutron flux, may become sufficiently great to cause damage to the curved wall 24, particularly after an extended period of usage. Such damage may take the form of one or more cracks in the curved end wall 24.

By providing the deviation 30, whereby the curved end wall portion 24 is flatter in curvature than a truly circular cross sectional curvature, the thermal stresses in the curved end wall portion 24 are approximately or partially neutralized or counteracted by the bending stresses, produced in the curved wall 24 by the pressure of the helium coolant on the concave side of the wall 24. The bending moments in the curved wall 24, due to the deviation 30 from a true circular curvature, tend to produce a stress pattern in which there are compressive components on the concave side and tensile components on the convex side. Both components are opposed to the direction of the thermal stress components, so that the two sets of stress components tend to neutralize or counteract each other. By judicious selection of the deviation, the thermal stress components are at least approximately or partially counteracted or neutralized by the bending stress components. The amount of the deviation 30 depends upon the pressure differential between the concave and convex sides, the temperature differential between the convex and concave sides, the thickness of the curved wall 24, and the characteristics of the material employed in the curved wall 24. From these parameters, the amount of the deviation 30 can be calculated or derived by a person having ordinary skill in the art. The amount of the deviation 30 is exaggerated in FIGS. 1 and 2 for clarity of illustration.

By providing the deviation 30, the useful life of the first wall 10, particularly the curved portion 24, is substantially prolonged.

For clarity, the concave and convex sides of the curved end wall portion 24 are identified as 32 and 34 in FIG. 2.

In FIGS. 1 and 2, the invention is applied to a first wall construction 10 made from a material which is basically platelike and is formed into the curved lobes 12.

FIGS. 3–6 illustrate a modified embodiment in which the invention is applied to a more complex first wall 110 utilizing a hollow lobe 112 having a pair of spaced side wall portions 120 with a curved end wall portion 124 therebetween. As explained in connection with FIGS. 1 and 2, the curved end wall portion 124 may be approximately cylindrical in cross section but deviates from being truly circular or cylindrical in cross section by an amount such that the thermal stresses in the curved wall 124 are at least approximately or partially neutralized or counterbalanced by the bending stresses due to the fluid pressure of the helium coolant within the lobe 112. As explained previously, the curvature of the curved end wall portion 124 is somewhat flatter than a truly circular cross sectional curvature, by the amount of such deviation, so that the fluid pressure on the concave side of the wall 124 tends to produce bending stresses in the curved wall. Such bending stresses at least approximately or partially neutralize the thermal stresses due to the high heat flux and the high neutron flux on the convex side of the curved wall 124.

Figures 3, 4, 5, 6:
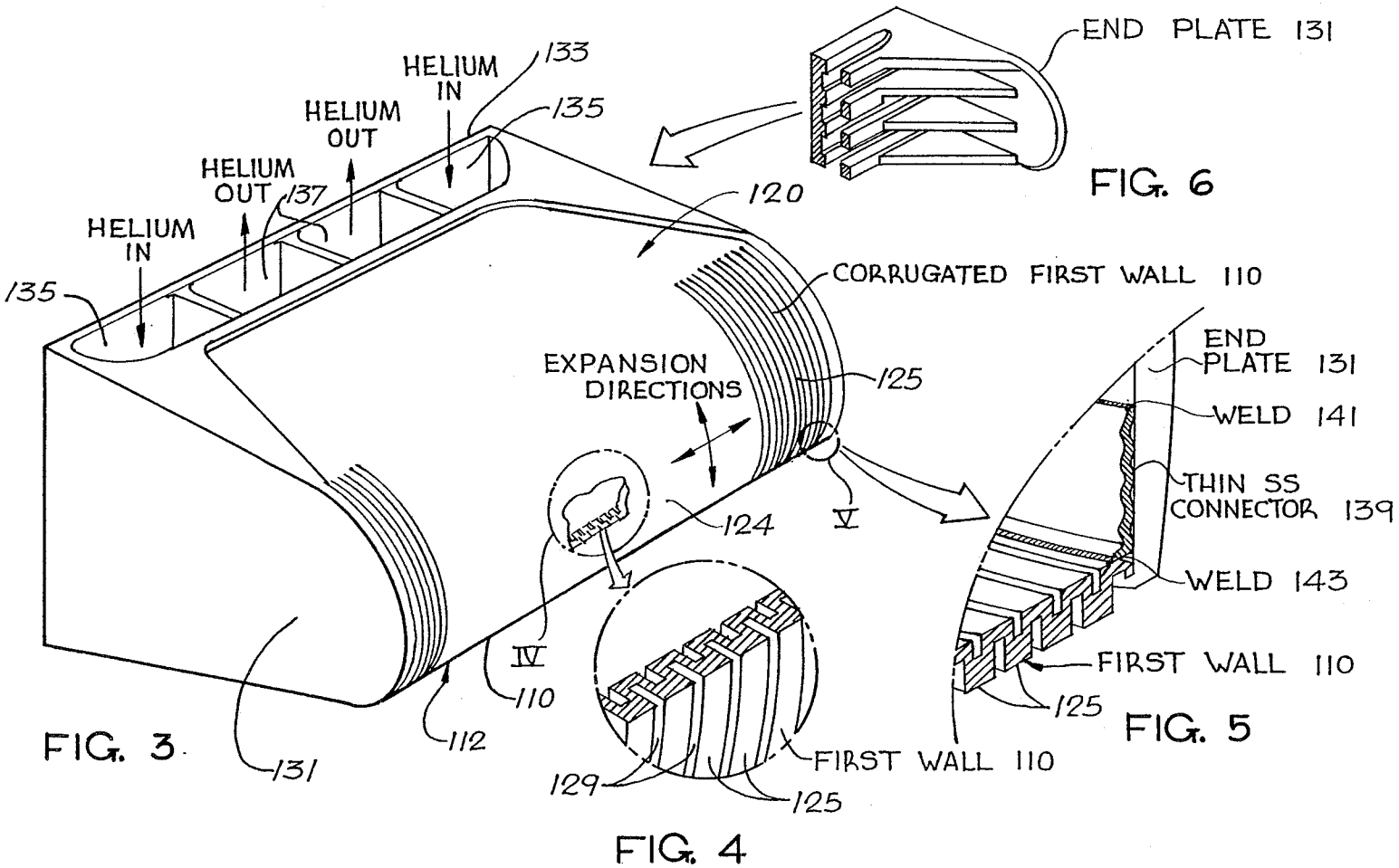
FIG. 3 is a somewhat diagrammatic perspective view illustrating a modified lobe construction having a corrugated first wall, utilizing the present invention.
FIG. 4 is an enlarged fragmentary section, corresponding to a broken out portion of FIG. 3, as identified by the broken line circle IV.
FIG. 5 is a fragmentary enlarged broken out section, taken as indicated by the broken line circle V in FIG. 3.
FIG. 6 is a fragmentary sectional perspective, showing the right hand end plate portion of the lobe shown in FIG. 3.

As shown in FIGS. 3–5, the first wall 110 differs from the first wall 10 in that the first wall 110 is formed with a series of peripheral corrugations 125 which relieve thermal stresses in a direction transverse to the peripheral direction of the corrugations. Because the corrugations 125 extend peripherally, the first wall 110 still has adequate strength to resist the peripheral stresses due to the fluid pressure of the coolant on the concave side of the first wall 110.

The corrugations 125 extend in a peripheral direction around the curvature of the curved end wall portion 124, and thus are fully capable of withstanding the peripheral tension due to the high pressure helium coolant within the lobe 112. The corrugations 125 may be produced by starting with a flat platelike member, to become the lobe 112, and by milling grooves 127 and 129 in the opposite sides of the platelike member. Such member is then formed into its final shape, with the substantially flat side wall portions 120 and the curved end wall portion 124. Such forming may be done by a hot forming operation, whereby the stresses due to the forming operation are relieved. The curvature of the curved end wall portion 124 is made somewhat flatter than a truly cylindrical curvature, by the amount of the desired deviation, so that the thermal stresses, produced in the curved wall 124 by the high temperature differential between the convex and concave sides, are at least approximately or partially neutralized or counteracted by the bending stresses, developed in the curved wall 124 by the high fluid pressure on the concave side.

As shown in FIG. 3, 5 and 6, the lobe 112 is provided with a pair of opposite end plates 131 which restrain the corrugated first wall 110 against any substantial expansion in an endwise or axial direction, transverse to the direction of the corrugations 125. The end plates 131 may be formed in one piece with a strong rigid back member 133, having coolant passages 135 and 137, to carry the pressurized helium coolant into and out of the lobe 112.

As shown in FIG. 5, each end of the corrugated first wall 110 may be connected to the corresponding end plate 131 by a thin connector 139, made of stainless steel or some other suitable material. A weld 141 is provided between one edge of the connector 139 and the corresponding end plate 131. Another weld 143 is provided between the other edge of the connector 139 and the adjacent edge of the corrugated first wall 110. Preferably, the connector 139 is corrugated to provide a degree of flexibility, so that both thermal stresses and pressure stresses will be relieved to some degree. Thus, the corrugated connector 139 provides a flexible bellows action to some degree. All of the components of the lobes 112 may be made of stainless steel or some other suitable material.

In tokamak first wall constructions involving curved lobes, the construction of the first wall can be improved, in accordance with the present invention, by modifying the curvature of the curved wall portion of each lobe, so that the curved wall portion is not truly cylindrical or circular in cross section, but rather incorporates a deviation from a truly circular shape, so that bending stresses tend to be developed in the curved wall by the fluid pressure on the concave side. These bending stresses at least approximately or partially neutralize or counteract the thermal stresses, due to the high temperature differential between the convex and concave sides of the curved wall. By utilizing this improved construction, the ability of the curved wall to withstand the thermal stresses, as well as the pressure stresses, is enhanced, so that the useful life of the first wall is increased.

The first wall of a tokamak thermonuclear fusion reactor is subjected to very severe operating conditions, as can be illustrated by some typical design parameters, given by way of example. The pressure of the pressurized helium coolant may be on the order of 5 MPa, equivalent to about 725 psi. The tensile stress in the curved end wall portion of each lobe, due solely to the pressure of the helium coolant, may be on the order of 20,000 psi, equivalent to about 138 MPa. This is well within a typical design maximum stress for PCA stainless steel of about 390 MPa, equivalent to about 56,500 psi. However, without the benefit of the present invention, the localized stresses in the curved end wall portion may exceed the design maximum stress, due to the thermal stresses caused by the high heat flux and the high neutron flux on the convex side of the curved end wall portion. The heat flux wall loading may be on the order of one megawatt per square meter. The neutron flux wall loading may be on the order of five megawatts per square meter. The pressurized helium coolant may be supplied at about 275° C. and may be heated to about 500° C. by the combination of the heat flux and the neutron flux. The thickness of the first wall may be on the order of 5 mm.

With the benefit of the present invention, the maximum stress in the first wall can be kept well below the maximum design stress.

It will be understood that the figures mentioned above are given merely by way of example, and that the operating parameters may vary widely for different installations.

We claim:

1. A curved wall for a vessel that is to be used in an environment which causes opposing stress components in opposite sides of the curved wall,
comprising a series of hollow lobes,
each lobe having a pair of side wall portions with a curved end wall portion extending therebetween,
said curved end wall portion having a concave side and a convex side,
each lobe being adapted to withstand substantial pressure on said concave side while withstanding substantial heat flux on said convex side,
said curved end wall portion having a shape which is approximately cylindrical in curvature but differs from being truly circular in curvature by a substantial deviation, in that said curved end wall portion is flatter in curvature than a truly circular curvature by the amount of said deviation, such that the thermal stresses generated in said curved end wall portion by said heat flux are at least approximately balanced by the bending stresses generated in said curved end wall portion by said pressure.

2. A first wall construction according to claim 1,
in which the heat flux is accompanied by a high flux of neutrons,
said hollow lobes containing means including lithium for bombardment by the neutrons to produce tritium.

3. A first wall construction according to claim 2,
in which a pressurized helium coolant is contained in said hollow lobes for circulation therethrough.

4. A first wall construction according to claim 1,
in which the heat flux is accompanied by a high flux of neutrons,
said hollow lobes containing tubular members having lithium therein for bombardment by the neutrons to produce tritium.

5. A first wall construction according to claim 4,
in which a pressurized helium coolant is contained in said hollow lobes for circulation therethrough.

6. A first wall construction according to claim 1,
in which said curved end wall portion has a cross-sectional curvature which is generally semi-elliptical and corresponds generally in shape to the flatter half of an ellipse.

7. A first wall construction according to claim 1,
in which said curved end wall portion has a crosssectional curvature which is generally semi-oval and corresponds generally to the shape of the flatter half of an oval.

8. A first wall construction according to claim 1,
in which each hollow lobe comprises a generally platelike member formed in one piece into said side wall portions and said curved end wall portion.

9. A first wall construction according to claim 1,
in which said curved end wall portion is formed with a plurality of peripheral corrugations affording a flexible bellows action to relieve stresses in a direction transverse to said corrugations.

10. A first wall construction according to claim 1,
in which a pressurized helium coolant is contained in said hollow lobes for circulation therethrough.

11. A first wall construction for a tokamak reactor,
comprising a series of hollow lobes,
each lobe having a pair of side wall portions with a curved end wall portion extending therebetween,
said curved end wall portion having a concave side and a convex side,
each lobe being adapted to withstand substantial pressure on said concave side while withstanding substantial heat flux on said convex side,
said curved end wall portion having a shape which is approximately cylindrical in curvature but differs from being truly circular in curvature by a substantial deviation, in that said curved end wall portion is flatter in curvature than a truly circular curvature by the amount of said deviation, such that the thermal stresses generated in said curved end wall portion by said heat flux are at least approximately balanced by the bending stresses generated in said curved end wall portion by said pressure.

12. A first wall construction according to claim 11,
in which the heat flux is accompanied by a high flux of neutrons,
said hollow lobes containing means including lithium for bombardment by the neutrons to produce tritium.

13. A first wall construction according to claim 12,
in which a pressurized helium coolant is contained in said hollow lobes for circulation therethrough.

14. A first wall construction according to claim 11,
in which the heat flux is accompanied by a high flux of neutrons,
said hollow lobes containing tubular members having lithium therein for bombardment by the neutrons to produce tritium.

15. A first wall construction according to claim 14,
in which a pressurized helium coolant is contained in said hollow lobes for circulation therethrough.

16. A first wall construction according to claim 11,
in which said curved end wall portion has a crosssectional curvature which is generally semi-elliptical and corresponds generally in shape to the flatter half of an ellipse.

17. A first wall construction according to claim 11,
in which said curved end wall portion has a crosssectional curvature which is generally semi-oval and corresponds generally to the shape of the flatter half of an oval.

18. A first wall construction according to claim 11,
in which each hollow lobe comprises a generally platelike member formed in one piece into said side wall portions and said curved end wall portion.

19. A first wall construction according to claim 11,
in which said curved end wall portion is formed with a plurality of peripheral corrugations affording a flexible bellows action to relieve stresses in a direction transverse to said corrugations.

20. A first wall construction according to claim 11,
in which a pressurized helium coolant is contained in said hollow lobes for circulation therethrough.

* * * * *